United States Patent [19]
Vowles

[11] Patent Number: 5,103,524
[45] Date of Patent: Apr. 14, 1992

[54] APPARATUS FOR CLEANING THE INNER SURFACES OF TUBES IN OPERATING MULTI-TUBE HEAT TRANSFER DEVICES

[75] Inventor: Robert W. Vowles, North Melbourne, Australia

[73] Assignee: Barry Bros. Specialised Services Pty. Ltd., Victoria, Australia

[21] Appl. No.: 571,666

[22] PCT Filed: Feb. 8, 1990

[86] PCT No.: PCT/AU90/00049
§ 371 Date: Nov. 16, 1990
§ 102(e) Date: Nov. 16, 1990

[87] PCT Pub. No.: WO90/09556
PCT Pub. Date: Aug. 23, 1990

[30] Foreign Application Priority Data

Feb. 8, 1989 [AU] Australia ............................ PJ 2621

[51] Int. Cl.⁵ ................................................ B08B 9/04
[52] U.S. Cl. .................................. 15/3.51; 15/104.063; 165/95
[58] Field of Search .................... 15/3.5, 3.51, 104.063; 165/95

[56] References Cited

U.S. PATENT DOCUMENTS

| | | | |
|---|---|---|---|
| 597,185 | 1/1898 | Huebner | 15/3.5 |
| 1,715,442 | 6/1929 | Weis | 15/3.5 |
| 1,808,870 | 6/1931 | Strasburg | 15/3.5 |
| 1,814,766 | 7/1931 | Oberhuber | 15/3.5 |
| 3,531,813 | 10/1970 | Hurst | 15/104 |
| 3,631,555 | 1/1972 | Hurst et al. | 15/3.5 |
| 4,467,488 | 8/1984 | Creek | 15/3.5 |
| 4,716,611 | 1/1988 | Barry | 15/3.51 |
| 4,724,007 | 2/1988 | Barry et al. | 15/3.5 |
| 4,793,016 | 12/1988 | Valentine et al. | 15/104 |

FOREIGN PATENT DOCUMENTS

18165/83  2/1985 Australia .
2563331 10/1985 France ............................... 165/95

Primary Examiner—Edward L. Roberts
Attorney, Agent, or Firm—Ernest V. Linek

[57] ABSTRACT

Apparatus for cleaning tubes in an array of such tubes (162, 175) such as heat exchanger or condenser units that will allow such cleaning action to be undertaken without removing the unit containing the array of tubes from normal service, the apparatus being adapted to be mounted in a head space zone of the unit and comprising a launcher (159, 192) movable on the head space zone to align with the tubes to be cleaned, the launcher being arranged to receive sequentially projectiles (1) from a projectile supply path (11) and to transfer same in a sealed manner to a pressurized fluid delivery path (89, 39) passing through the launcher (159, 192) so that the projectile is aligned with a tube to be cleaned.

11 Claims, 11 Drawing Sheets

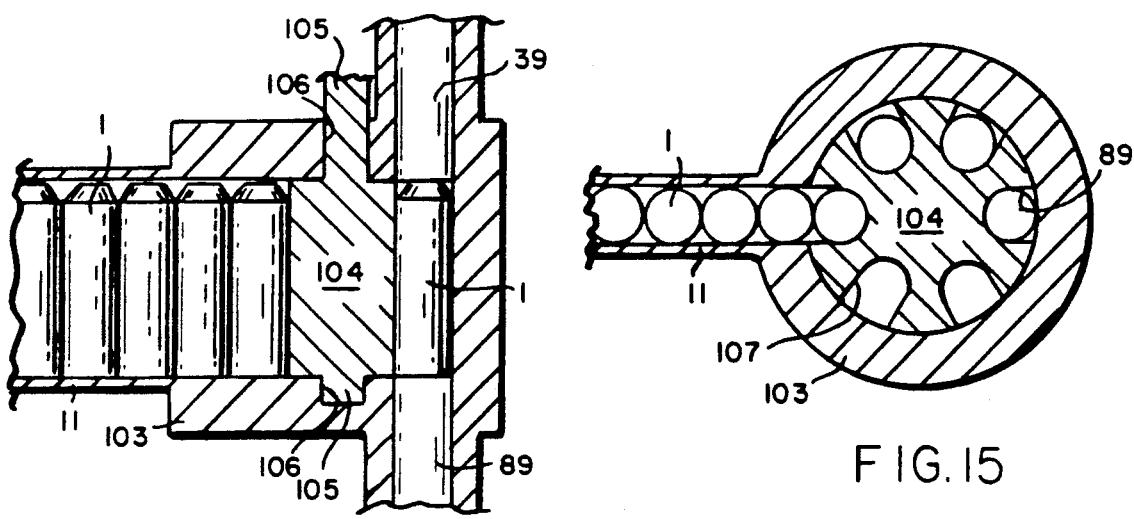
FIG. 14
FIG. 15
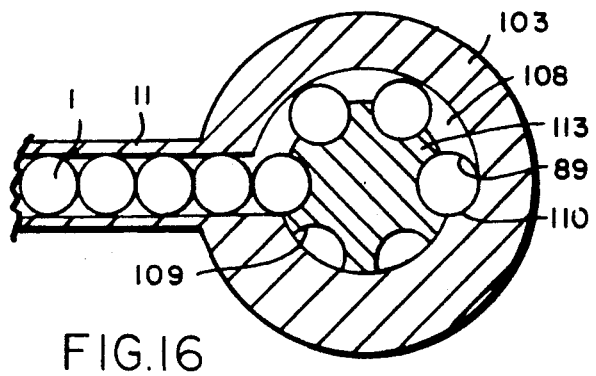
FIG. 16
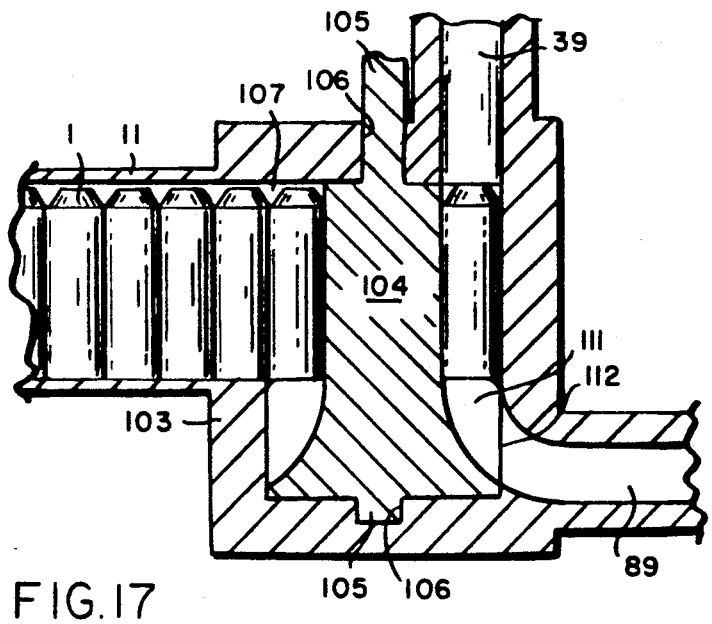
FIG. 17

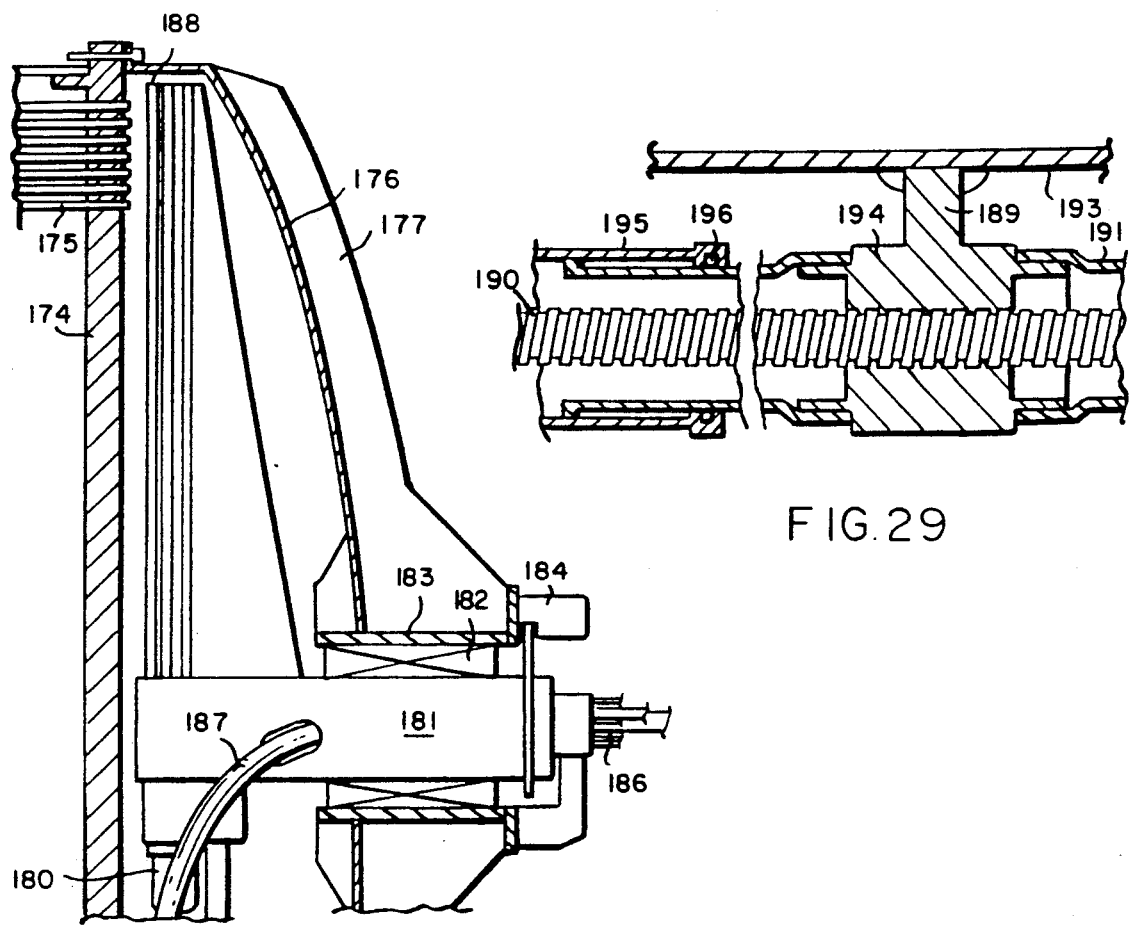
FIG. 27
FIG. 29
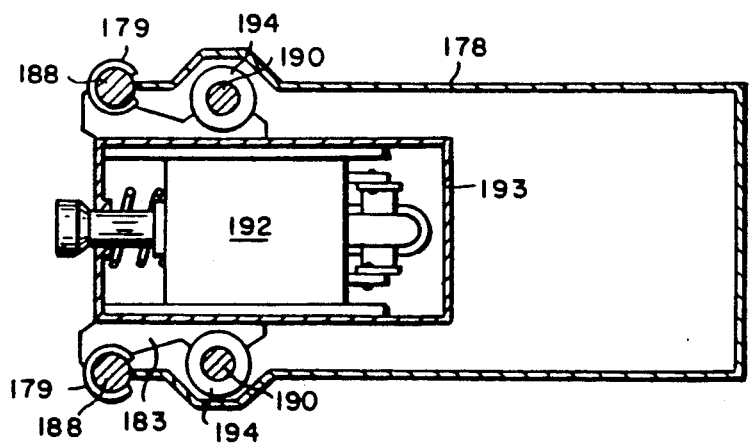
FIG. 28

APPARATUS FOR CLEANING THE INNER SURFACES OF TUBES IN OPERATING MULTI-TUBE HEAT TRANSFER DEVICES

FIELD OF THE INVENTION

The present invention relates to improvements in apparatus for cleaning the inner surfaces of tubes, in particular tubes arranged in regular arrays and forming part of multi-tube heat transfer devices such as shell and tube type heat exchangers and condensers, which apparatus may be employed whilst such heat transfer devices are maintained in operation.

BACKGROUND OF THE INVENTION

Methods and apparatus by means of which tubes in a multi-tube heat transfer device may be cleaned of fouling deposits whilst the unit is maintained in operation are well known in the art. Apart from chemical cleaning methods, mechanical cleaning systems are typified by those made by Taprogge and Water Services of America, the use of which is almost totally confined to the cleaning of condenser tube bundles. In the Taprogge System, balls made of a soft, resilient material and with a diameter slightly larger than that of the tubes to be cleaned are released into the incoming cooling water flow of a condenser and are carried by the water through the tubes where they wipe the inner surfaces. Each tube is expected to receive a ball approximately every five minutes. Abrasive balls may be used initially for the removal of an existing consolidated fouling deposit. The balls are recovered from the outgoing water flow, being automatically gauged and replaced as wear occurs. The shortcomings of the Taprogge System are that the cleaning balls wear quite rapidly and, notwithstanding the installation of deflectors in the header box of the condenser, tend to pass more frequently through some tubes than others. The cleaning effect is thus not evenly distributed throughout the whole tube array. The Taprogge System has not been adapted to applications where elevated temperatures are involved and, for obvious reasons, it is not effective in the removal of deposits of contaminant material which have built up to more than a very slight degree. The cost of installing the Taprogge System is high and its use is therefore usually confined to applications where a specific and acute fouling problem exists.

The "Superscrubber System" made by Water Services of America uses brushing units which are captured in cages at the upstream ends of each tube. The brushing units are carried through the tubes by water flow and lodge in cages at their downstream ends. In a simple arrangement, the direction of cooling water flow through the condenser is reversed to repeat the cleaning process and return the brushing units to their original cages. Means have been devised to obviate the need to reverse the cooling water flow. These embody a radial duct which may be swept across the downstream ends of tubes to apply a localised water flow which redeploys the bushing units to the upstream ends of the tubes. U.S. Pat. Nos. 4,124,065, 4,269,264 and 4,353,414 describe various developments of this system. The shortcomings of the Water Services of America system are generally similar to those of the Taprogge System: it is expensive to install; it cannot remove existing consolidated fouling deposits; the brushing units wear and cannot be replaced whilst a heat transfer unit is on-line; brushes lodge in tubes and cannot be freed whilst the heat transfer unit is on-line; and its use is confined to applications which do not involve elevated temperatures.

Australian Patent Nos. 571,845, 572,181 and Patent Application No. 12079/88 disclosed a method of removing deposits of contaminant material from the inner surfaces of tubes by propelling a suitably dimensioned projectile through each tube by means of a virtually instantaneous release of a pressurised liquid. The diameter of the said projectile was less than that of the inner diameter of the tube to be cleaned and the cleaning mechanism was assumed to result from effects generated in the flow of liquid cleaning medium by the passage of the projectile. In the preferred embodiment, the projectile was simple, unitary and not fitted with scraping, abrading or brushing elements.

SUMMARY OF THE INVENTION

The present invention relates to improvements in apparatus adapted to carry out tube cleaning methods of the general type disclosed in Australian Patent Nos. 571845, 572181 and Patent Application No. 12079/88 and in particular relates to apparatus enabling the sequential delivery of relatively incompressible projectiles to positions from which they may be propelled through tubes to be cleaned by the sudden release of a flow of pressurised liquid.

Accordingly, the present invention provides a projectile launcher adapted for use in tube cleaning apparatus, said launcher comprising a launcher barrel having a muzzle end adapted for movement towards a tube to be cleaned, a liquid delivery path extending through said launcher and said launcher barrel, a projectile transfer duct arranged to sequentially supply projectiles to said launcher along a projectile supply path generally transverse to said liquid delivery path, and a breech block mechanism arranged to sequentially receive said projectiles from said projectile supply path and to move said projectile into alignment with said liquid delivery path to enable said projectile to be moved along said liquid delivery path to the muzzle end of said launcher barrel.

In this manner, a projectile may be supplied from a suitable remote storage zone along said projectile transfer duct and be placed into a position at the muzzle end of said launcher barrel from whence it may be propelled through a tube to be cleaned by a sudden release of pressurised liquid.

Conveniently, the breech block mechanism is located in said liquid delivery path and comprises a breech member adapted for movement in a pivotal manner within a breech chamber, said breech member being moveable from a first position where a projectile may be received into a bore extending through it and a second position where said received projectile is aligned with said liquid delivery path.

The following description discloses specifically a number of different forms of breech block mechanisms and associated launcher devices as well as several other independent improvement aspects associated with tube cleaning apparatus of the foregoing type. Such aspects include positioning and supporting the barrel or delivery means of the launcher collinear with the end of each tube to be cleaned; sealing of the barrel muzzle of the said launcher to the end of a tube to cleaned; propelling of a projectile from the said launcher through a tube to cleaned by means of a release of pressurised liquid cleaning medium, said projectile being launched either directly from the launcher breech mechanism or after displacement from the said breech mechanism into the tube end by mechanical or fluid pressure means; recovery of projectiles from the downstream tubeside flow; and generation of a supply of pressurised liquid cleaning medium for the purpose of propelling said projectiles. The apparatus for the performance of the said functions further includes ducts for the transmission of oil hydraulic pressure, liquid cleaning medium and compressed air from sources outside of the said casing of the heat transfer device to the said launcher and its breech mechanism actuator, to the actuator by means of which the launcher barrel muzzle is clamped to each tube, and to the actuators of the said positioning and support means; sensors by means of which the occurrence of various functions within each tube cleaning cycle are signalled via suitable circuits to the electronic controller; and valves and switches by means of which all functions are regulated under command of the said controller.

The present invention provides an improvement over previous forms of cleaning apparatus in that the tubes of a multi-tube heat transfer device may be cleaned whilst the unit is maintained in operation and without the need to wholly or partially dismantle it, the flow of heat transfer medium through the unit being uninterrupted except for the momentary blockage of each tube as it is cleaned, and every tube in a bundle or array being positively located and subjected to the cleaning process. The cleaning process is therefore performed uniformly over the whole of a tube bundle or array and the method is effective against established, consolidated and quite intractable fouling deposits.

In accordance with a further aspect of the present invention, there is provided apparatus for cleaning an array of tubes having open ends at at least one end of said array, and at least one end cover enclosing a head space adjacent said tube open ends, said apparatus comprising a projectile launching mechanism adapted to be located within said head space and arranged for movement therein to align and engage projectile delivery means with an open end of a said tube of the array of tubes to be cleaned, projectile supply means for moving projectiles sequentially to a position adjacent said launching mechanism, a pressurised liquid passage passing through said projectile launching means, a projectile transfer mechanism enabling sequential sealed transfer of a projectile from the projectile supply means to said pressurised liquid passage and means for supplying a flow of pressurised liquid along said pressurised liquid passage to move a said projectile located therein into and through said tube to be cleaned.

The present invention also anticipates the provision of any one or more of the following disclosed aspects whether considered individually or in combination.

BRIEF DESCRIPTION OF THE DRAWINGS

The various aspects of the present invention will be more readily understood by reference to the following description of preferred embodiments given in relation to the accompanying drawings in which:

FIG. 14 is a longitudinal cross-sectional view of an alternative embodiment of launcher rotary breech block mechanism;

FIG. 15 is a transverse cross-sectional view of the mechanism shown in FIG. 14;

FIG. 16 is a transverse cross-sectional view of an alternative embodiment of the mechanism shown at FIGS. 14 and 15;

FIG. 17 is a longitudinal cross-sectional view of an alternative embodiment of the mechanism shown at FIGS. 14 and 15;

FIG. 27 is a cross-sectional view of the end of a heat exchanger and casing showing an embodiment of rotary axis positioning and support arrangement with detail shown of its bearings, drive and feed provisions;

FIG. 28 is a transverse cross-sectional view of the radial support arm of the arrangement shown at FIG. 27 showing the launcher and details of its bearing and positioning provisions;

Figure 30:
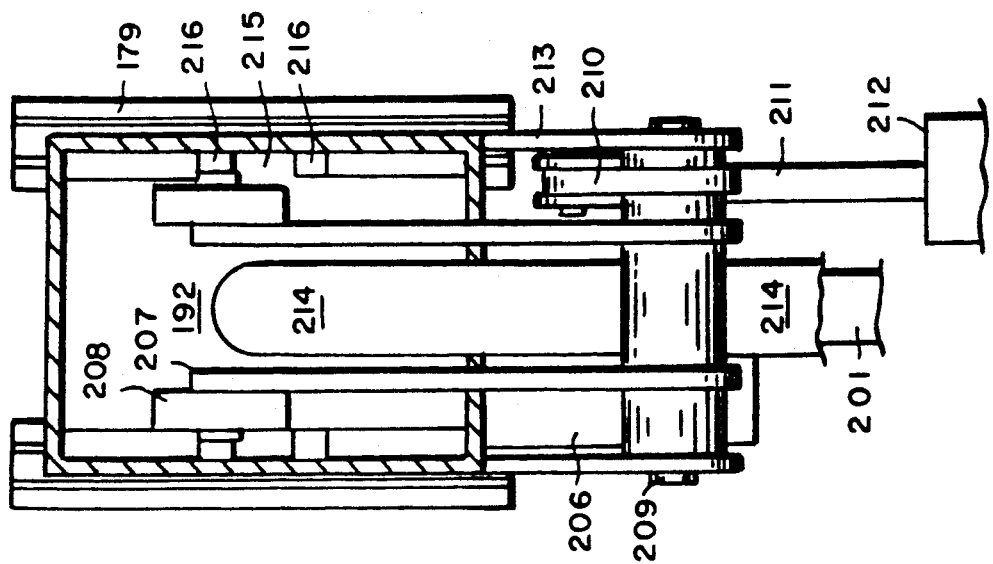
Figure 31:
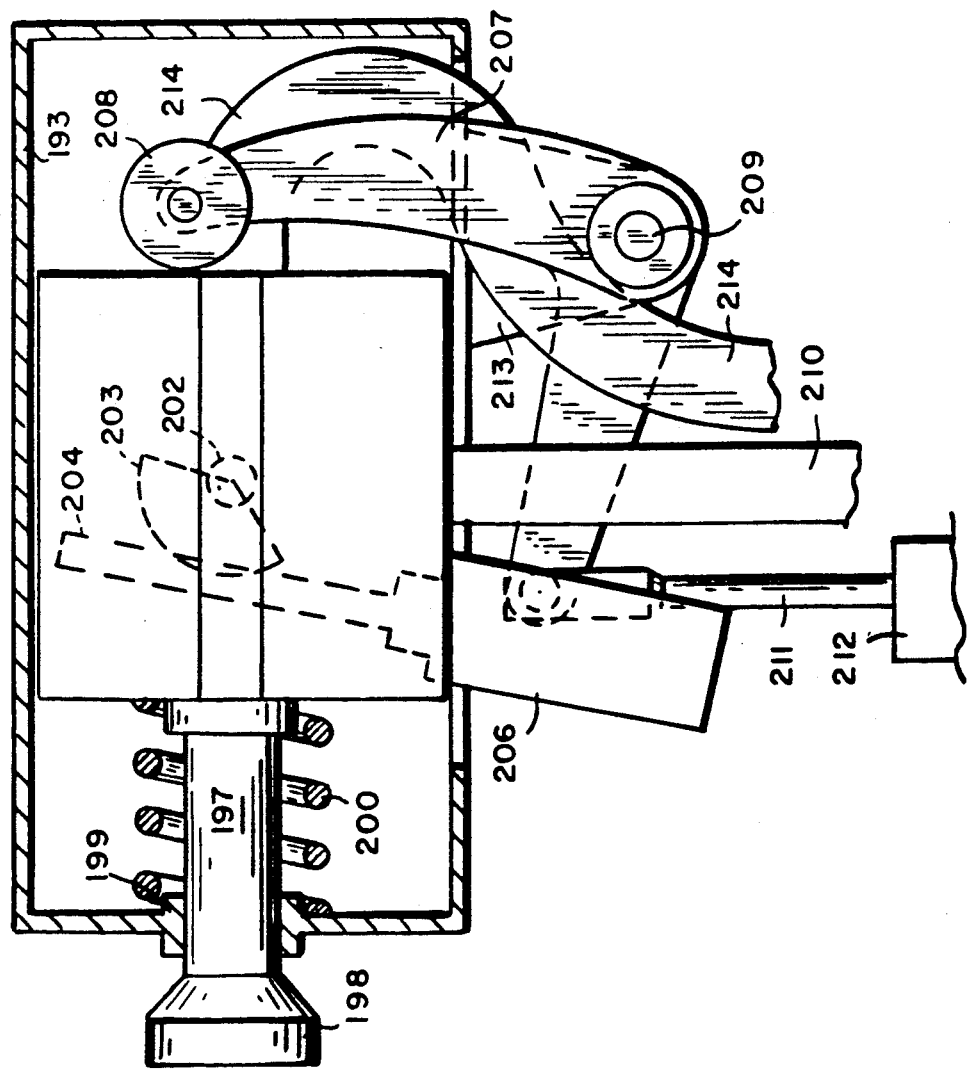
Figure 32:
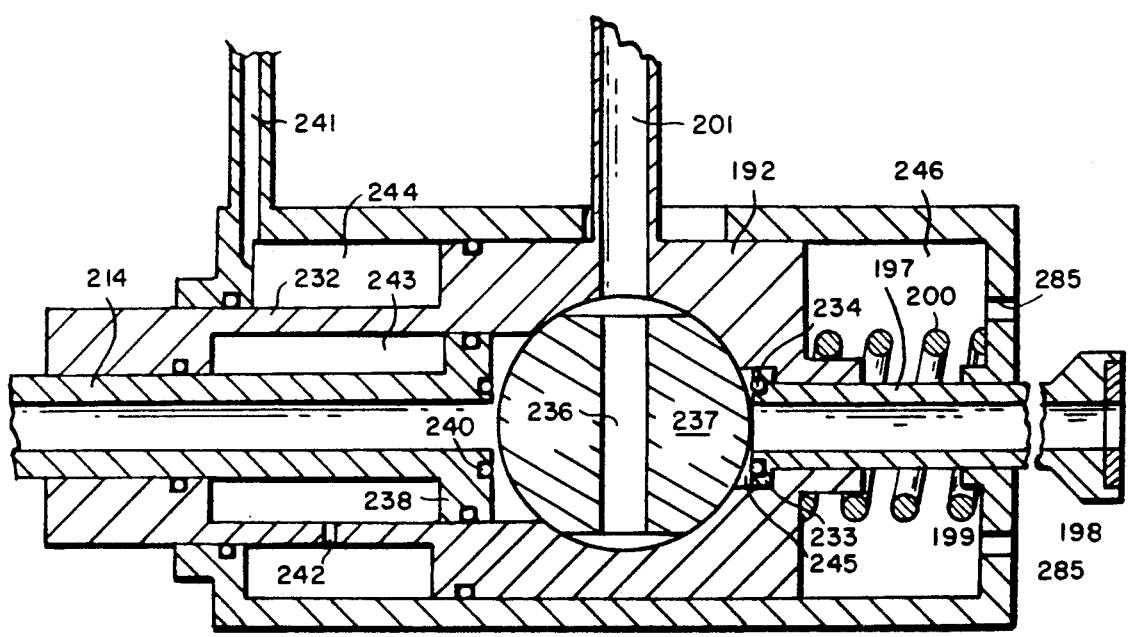

FIG. 29 is a longitudinal cross-sectional view of part of the screw positioning provisions of the arrangement shown at FIG. 27, detailing a method of enclosure;

FIG. 30 is a view from the end of one embodiment of the launcher after removal of the top of the launcher support casing;

FIG. 31 is a view from the side of the launcher embodiment shown at FIG. 30 after removal of the side of the launcher support casing and with the position of certain obscured components shown in broken line; and FIG. 32 is a longitudinal cross-sectional view of an alternative form of launcher.

DETAILED DESCRIPTION OF THE INVENTION

Figure 1:
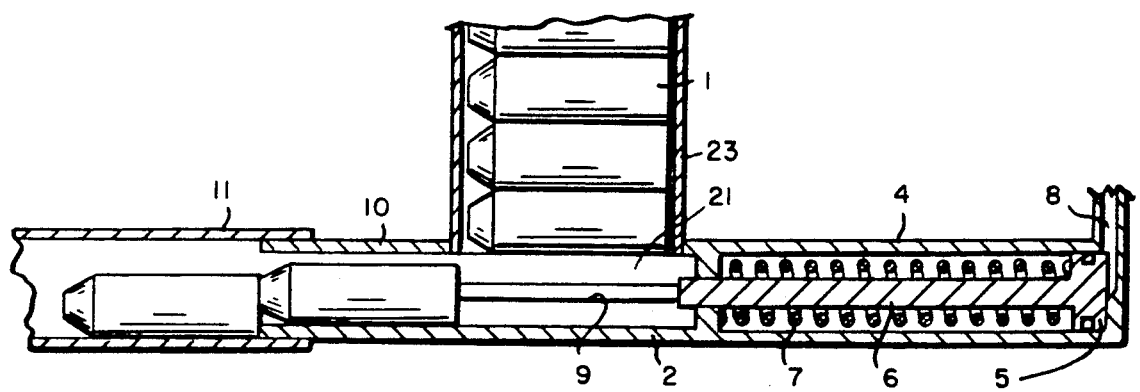
FIG. 1 is a longitudinal cross-sectional view of a feeding mechanism incorporated into a projectile storage provision.

With reference to FIG. 1, projectiles 1 are stored in a storage hopper (not shown) and descend under their own weight through throat 23 at the base of the said hopper into slot 21 in feeder block 2. Where necessary, percussion or other suitable means is employed to promote the free descent of projectiles from the said storage hopper. Fixed to one end of feeder block 2 is cylinder 4, in which is slideably accommodated piston 5 to which is rigidly attached feeder ram 6 which extends into slot 21 in feeder block 2. Projectile transfer duct 11 is made from some suitable flexible material and is fixed to spigot 10 formed on the other end of feeder block 2, the axis of its inner bore being collinear with that of slot 21 therein. In operation, the application of fluid pressure through inlet 8 to piston 5 causes feeder ram 6 to extend through slot 21 in feeder block 2, thereby displacing a projectile therein through spigot 10 into projectile transfer duct 11. The travel of piston 5 is limited by the binding of the coils of piston return spring 7. To effect retraction of ram 6, inlet 8 is vented to atmosphere or drain, as appropriate to the nature of the activating fluid, and piston 5 returns to its rearward position under the influence of piston return spring 7.

Figure 2:
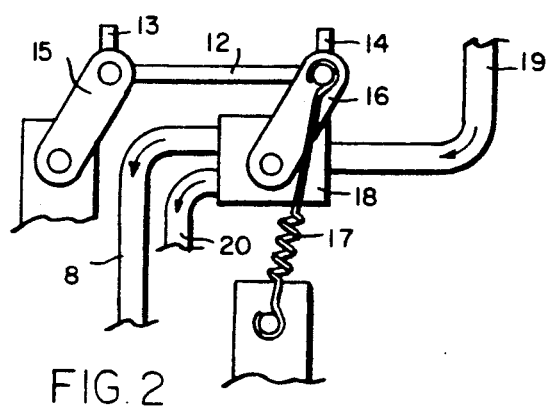
FIG. 2 depicts a valve actuation arrangement for the automatic operation of the feeding mechanism shown at FIG. 1.

With reference to FIGS. 1 and 2, the end of feeder ram 6 is provided with a radial extension (obscured) which extends out through a narrow slot 9 in the side of feeder block 2. A valve assembly comprising valve 18, valve actuating arm 16, idler arm 15, over-centre spring 17, valve actuation link 12, fluid connections 8 and 19 and fluid return/vent line 20 is mounted adjacent feeder block 2 and is positioned such that the said feeder ram radial extension strikes lugs 13 and 14 on valve actuation link 12 as it approaches its forward and rearward limits of travel. In operation, fluid pressure is made available to valve 18 through fluid connection 19 and, with piston 5 in its rearward position, fluid pressure is supplied to cylinder 4 through fluid inlet 8 and flow to fluid return or vent line 20 is cut off. As feeder ram 6 approaches its forward limit of travel, its said radial extension strikes lug 13 of valve actuation link 12 and carries it forward causing valve actuation arm 16 to be displaced to the left (in the orientation of FIG. 2) until, under the influence of over-centre spring 17, it is displaced sharply and fully to the left. Idler arm 15 serves merely to locate the free end of valve actuation link 12. With valve actuation arm 16 in the fully left position, valve 18 is repositioned such that fluid inlet 8 is connected to fluid return or vent line 20 and pressure from fluid connection 19 is cut off, thus permitting piston 5 to retract rearwards under the influence of piston return spring 7. As feeder ram 6 approaches its rearward limit of travel, its said lateral extension strikes lug 14 of valve actuation link 12 and carries it rearward causing valve actuation arm 16 to be displaced to the right (in the orientation of FIG. 2) until, under the influence of over-centre spring 17, it is displaced sharply and fully to the right. The feeding sequence is then repeated with the frequency of cycling being governed by the movement of projectiles up projectile transfer duct 11 as they are consumed by cycling of the said launcher.

Figure 3:
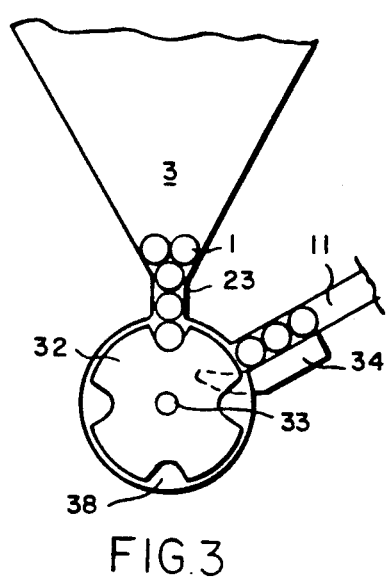
FIG. 3 is a transverse cross-sectional view of a feeding mechanism associated with a projectile storage provision and by means of which projectiles may be fed transversely into a transfer duct.
Figure 4:
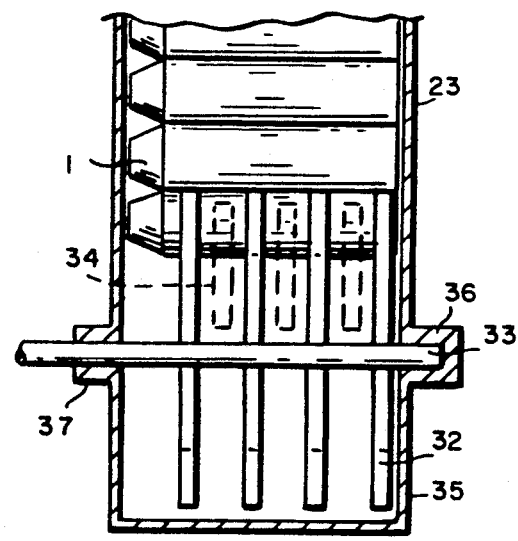
FIG. 4 is a longitudinal cross-sectional view of the mechanism shown at FIG. 3.

With reference to FIGS. 3 and 4, projectiles 1 descend through throat 23 into detents 38 in a plurality of rotor disks 32 fixed to shaft 33. Said shaft is rotatably supported in bearings 36 and 37 formed on the end walls of rotor housing 35. Extending outward from one side wall of said rotor housing is projectile transfer duct 11, in this configuration of rectangular cross-sectional shape to accommodate the movement of projectiles in a lateral position. Fixed to one wall of said projectile transfer duct or to rotor housing 35 are projectile transfer tynes 34 which extend through the side of said rotor housing and coact with rotor disks 32. In operation, said rotor disks are made to rotate (clockwise in the orientation of FIG. 3) with a short rest as each row of detents is adjacent hopper throat 23. A projectile 1 enters said row of detents in said rotor disks and, when said rotor disks rotate, is carried around and into contact with projectile transfer tynes 34 which deflect it into projectile transfer duct 11 through which it passes to a launcher.

Figure 5:
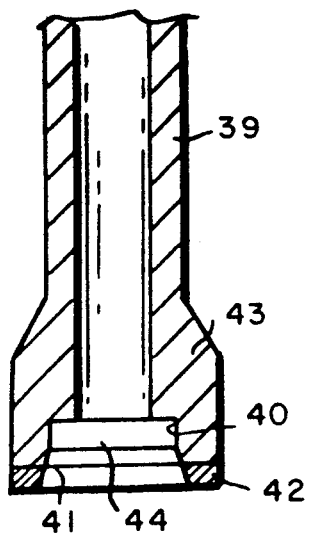
FIG. 5 is a longitudinal cross-sectional view of one embodiment of the launcher barrel muzzle sealing arrangement.

With reference to FIG. 5, a launcher barrel 39 is made with a fixed or detachable muzzle boss 43, the outer end of which is provided with a recess 44 to accommodate the ends of tubes to be cleaned and on the outermost surface of which is provided a sealing surface 42 made of a suitable hard, durable elastomeric material. The said recess comprises two circumferential surfaces, the first 41, the outermost diameter of which is larger than the external diameter of the tubes to be cleaned by at least the maximum positioning error of the launcher positioning and support means and which tapers to meet a second inner cylindrical surface 40 of a diameter slightly larger than the external diameter of the tubes to be cleaned. The launcher is mounted in its positioning and support means in such a way that radial movement of its barrel muzzle is permitted. In operation, as the said launcher barrel muzzle boss is advanced axially to engage the end of a tube to be cleaned, its tapered inner surface guides the said muzzle into accurate alignment with the end of said tube. The said cylindrical inner surface of the said boss then acts to accurately spigot the said muzzle in positional relationship with the end of said tube, and the said sealing surface seals the said barrel muzzle to the surface of the tube sheet (shown as 57 in FIG. 7) in which the said tube is fixed. The depth of the said launcher barrel muzzle boss recess is made such that it exceeds the length of tube to cleaned projecting beyond the face of the tube sheet in which it is mounted by at least the maximum possible axial compression of the said sealing ring. This ensures that the said sealing ring seals against the said tube sheet surface before the end of the tube to be cleaned contacts the innermost face of the said barrel muzzle boss recess.

Figure 6:
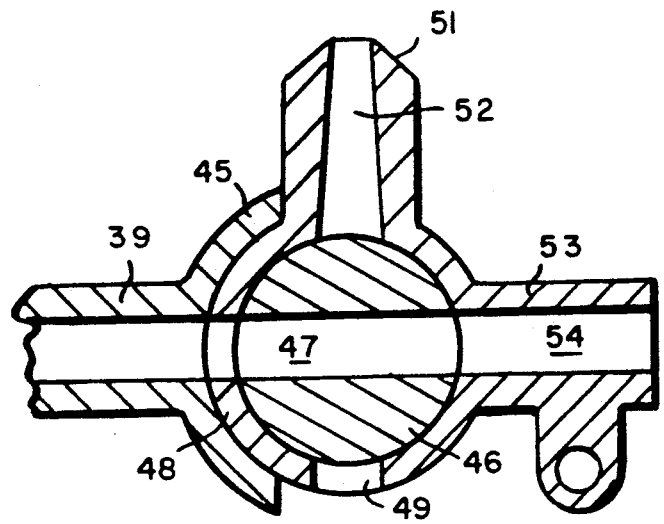
FIG. 6 is a longitudinal cross-sectional view of an embodiment of the launcher barrel muzzle which may be quickly changed from one configuration to another.

With reference to FIG. 6, a launcher barrel 39 is made with two muzzles 50 and 53, either of which may be pivotally positioned collinear with the said barrel. The end of barrel 39 is developed into part circular muzzle assembly support web 45, the width of which exceeds the external diameter of the said barrel. Fixed to one of the part circular edges of the said muzzle assembly support web is muzzle support side plate (obscured) which is more or less circular in shape and to which is fixed muzzle pivot ring support boss 46. Said muzzle pivot ring support boss takes the form of a solid cylinder pierced by barrel bore extension 47 made with the same internal diameter as and collinear with barrel 39. and is positioned such that an annular slot of regular width is created between its curved peripheral surface and the inner surface of said muzzle assembly support web. Muzzles 50 and 53 are fixed to muzzle pivot ring 48 which takes the form of a hollow cylinder pierced by barrel access ports 49 and 56 of the same diameter as the internal diameter of barrel 39 and collinear respectively with the bores of the said muzzles. Although the angular spacing between the said barrel muzzles may be any suitable, they are preferably separated by 90°. The axial depth of the said muzzle pivot ring is made very slightly less than the width of muzzle assembly support web 45 and its internal and external diameters are made such that, when it is positioned annular to said muzzle assembly support web and muzzle pivot ring support boss, just sufficient clearance is maintained to allow it pivotal movement. The said muzzle pivot ring is captured in position over the said muzzle pivot ring support boss by muzzle pivot ring capture plate (not shown) which covers the muzzle pivot ring and the side of the said muzzle assembly support web and is screwably fastened to the said muzzle assembly support web and to the said muzzle pivot ring support boss. Seals are provided as required to eliminate leakage of pressurised liquid cleaning medium through clearances. Muzzle pivoting lugs are provided on one or both muzzles and a force applied at a lug acts to pivot one or other of the said muzzles into position collinear with the said launcher barrel. In operation, it is sometimes desirable to be able to change rapidly from one type of muzzle configuration (such as that depicted at FIG. 5) to another (such as that depicted as 51 in the present Figure). Also, where a muzzle of the type depicted as 50 in the present figure is employed which embodies a tapered external surface 51 to engage the internal periphery of the end of a tube to cleaned, the final diameter of its bore 52 must necessarily be smaller than the internal diameter of the said tube. This precludes the feeding through the said muzzle bore of a projectile the diameter of which approximates the internal diameter of the said tube. The present invention permits a projectile to be fed up the said barrel, though parallel bore 54 of muzzle 43 and into the tube to be cleaned, said muzzle then being pivotally replaced by muzzle 50, the tapered end 51 of which is adapted to engage the end of the said tube.

Figure 7:
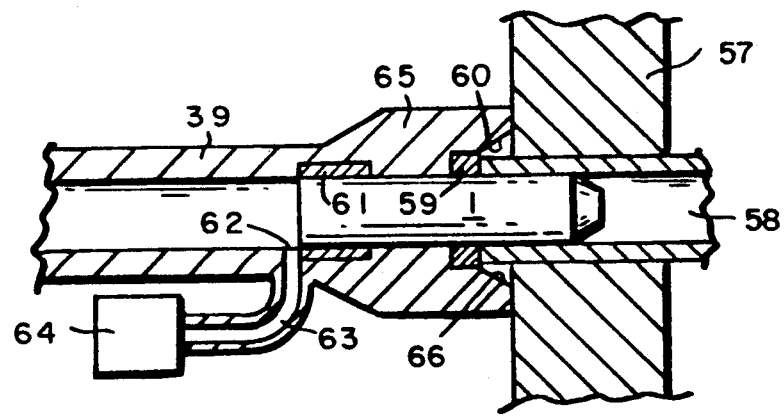
FIG. 7 is a longitudinal cross-sectional view of a further embodiment of a launcher barrel muzzle.

With reference to FIG. 7, a launcher barrel 39 is made with a fixed or detachable muzzle boss 65, the end of which is provided with a recess 66 to accommodate the ends of tubes to be cleaned. The circumferential surface 60 of the said recess is made such that it tapers inwards from an outermost diameter larger than that of the tubes to be cleaned to meet a cylindrical recess 59 of a diameter slightly larger than the external diameter of the tubes to be cleaned and which is occupied by a sealing ring made of some suitable hard, durable elastomeric material. The launcher is mounted in its positioning and support means in such a way that radial movement of its barrel muzzle is permitted and the maximum diameter of the said tapered surface is selected to accommodate the maximum positional error occurring in the said launcher positioning and support means. In operation, as the said launcher barrel muzzle is advanced axially to engage the end of a tube 58 to be cleaned the said tapered inner surface of the said muzzle boss guides the said muzzle into accurate alignment with the said tube prior to contact of the end of said tube with the said sealing ring. The depth of said launcher barrel muzzle boss recess is made such that it is less than the length of the said tube to be cleaned projecting beyond the face of the tube sheet 57 in which it is mounted by at least the maximum possible axial compression of said sealing ring. This ensures that the outermost surface of said muzzle boss cannot contact the surface of said tube sheet until the end of said tube to be cleaned has been sealed to said muzzle by said sealing ring.

Obviously, features of the launcher barrel muzzles depicted in FIGS. 5 and 7 may be combined in a single unit or used in an arrangement such as that shown in FIG. 6.

With further reference to FIG. 7, a projectile 1 (shown in the figure in its final position before launching) is introduced into launcher barrel 39 by a breech mechanism (not shown) of one of the forms hereinafter described. Positioned within the bore of the said launcher barrel a short distance in from the said launcher barrel muzzle is a sealing ring 61 made of some suitable soft elastomeric material, the inner diameter of which in its normal, undistorted state is such that a sealing effect is created between said seal and the surface of said projectile when the projectile is passing through it. Said sealing ring 61 might also be tapered inwardly in a downstream direction. Said sealing ring is also useful for retaining a projectile in position in a launcher prior to its firing when the barrel 39 of the launcher is vertically located. Immediately on the breech mechanism side of said sealing ring is positioned pressure sensing port 62 through which liquid pressure in the barrel muzzle area is communicated to pressure switch 64. In the preferred embodiment, the said pressure switch is mounted directly upon the said barrel and in an alternative embodiment, is remotely mounted and is connected to the said pressure sensing port by pressure sensing tube 63. In operation, after the said projectile is introduced into the said barrel by the said breech mechanism, a valve (not shown) is opened releasing into the said barrel on the side of the said breech mechanism remote from the said barrel muzzle a flow of low pressure water or other fluid medium which serves to carry said projectile down said launcher barrel, through said sealing ring and partly into the tube 5B to be cleaned with the end of which said launcher barrel muzzle is engaged. At the point where passage of the rear end of the said projectile uncovers said pressure sensing port, said pressure switch is operated to initiate closing of the valve through which the said flow of low pressure water or other fluid medium is admitted. The cleaning shot is then "fired" by the release of a flow of high pressure water or other liquid cleaning medium through the said barrel. If a misalignment exists between said barrel muzzle and said tube to be cleaned so that the said projectile cannot pass from the said launcher muzzle into the said tube to be cleaned; or if no projectile has been fed into the said barrel by the said breech mechanism; then said pressure switch will not be operated by a pressure rise at said barrel muzzle, resulting in the logic circuitry controlling the cleaning operation to suspend cycling of the launcher and signal a fault to the supervisor of the unit. The pressure of the said low pressure water or other liquid cleaning medium used to propel said projectile from said breech mechanism down said barrel to said launcher muzzle is not critical and is whatever will usefully perform the task. Preferably, mains pressure water is employed.

Figures 8, 9:
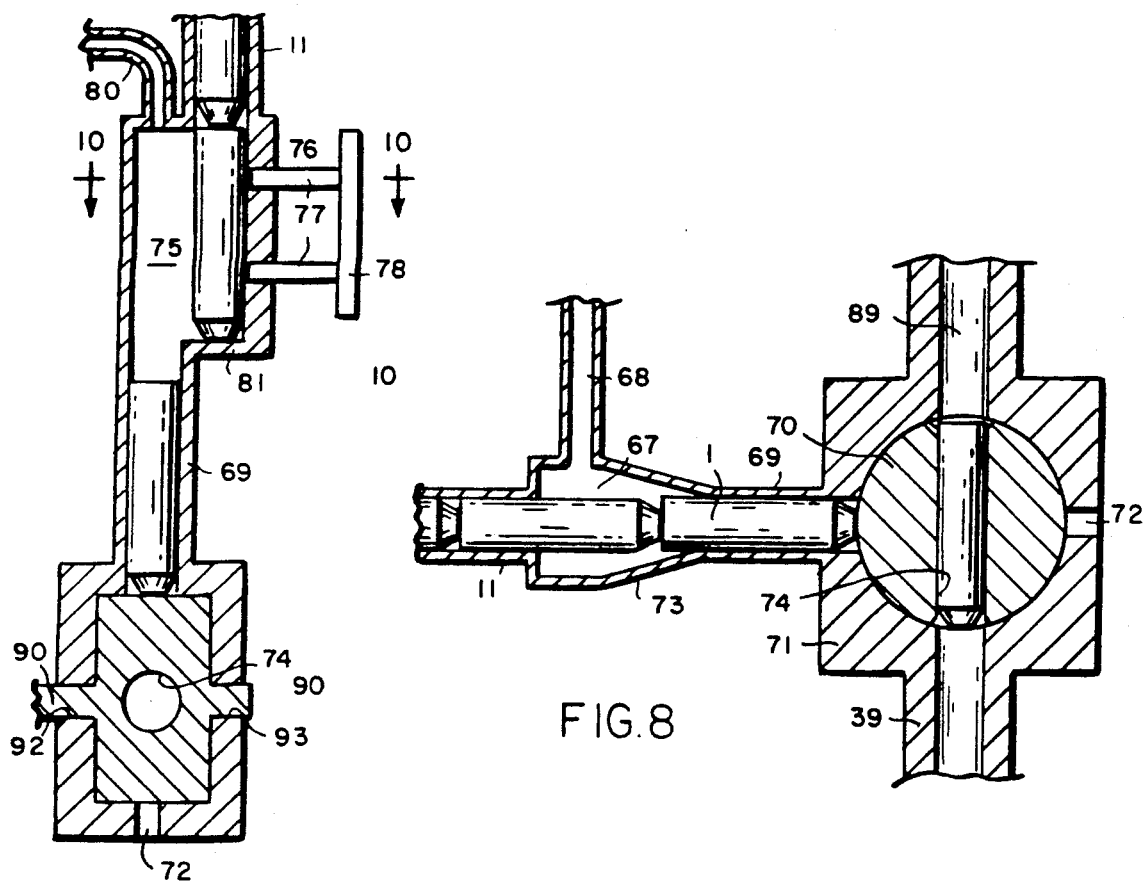
FIG. 8 is a longitudinal cross-section view of an embodiment of the projectile feed mechanism also showing a breech block mechanism.
FIG. 9 is a longitudinal cross-sectional view of a further embodiment of the projectile feed mechanism showing a breech block mechanism similar to that shown in FIG. 8.

With reference to FIG. 8, projectiles are propelled along projectile transfer duct 11 by a flow of some suitable pressurised fluid passing through it. Provided in the said projectile transfer duct just short of the breech mechanism of the projectile launcher is venting chamber 67 from which the said flow of pressurised fluid is vented or drained through duct 68. A projectile 1 is carried through said venting chamber by the urging of succeeding projectiles and is guided by tapered part 73 of said venting chamber to enter short projectile transfer duct 69 through which it passes to the launcher breech mechanism for loading.

With further reference to FIGS. 8 and 9, breech block housing 71 may be provided on launcher barrel 39 and accommodates cylindrical breech block 70 in the form of a flat disc with a bore 74 extending diametrically therethrough. Said breech block is supported by shafts 90 located in bearings 92 and 93 in the housing 71 (as depicted in FIG. 9). Said breech block bore may be brought into coincidence with projectile transfer duct 11 or launcher barrel bore 39. In operation, breech block 70 is rotationally positioned such that projectile 1 may enter bore 74 from projectile transfer duct 11. Said breech block is then rotationally positioned such that bore 74 is collinear with launcher, barrel bore 39. A flow of pressurised cleaning medium is then released through cleaning medium duct 89 propelling said projectile from breech block 70, and through barrel 39 to the tube to be cleaned. Vent aperture 72 is provided in breech block housing 71 to allow escape of any fluid accumulation in the breech block area. Actuation and indexing means may be provided on one end of shaft 90 to permit movement and precise positional control of breech block 70.

Figure 10:
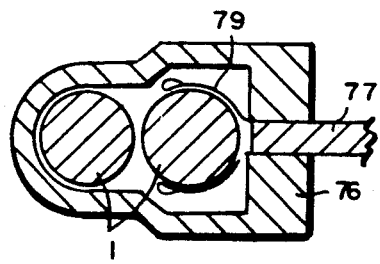
FIG. 10 is a transverse cross-sectional view on 10—10 of the mechanism shown at FIG. 9.

With reference to FIGS. 9 and 10, loading chamber 75 is provided in projectile transfer duct 11 and connected to breech block housing 71 by short projectile transfer duct 69, the length of both being sufficient to accommodate the longest projectile to be fed and the width of said loading chamber being sufficient to accommodate two projectiles positioned side by side. The part of said loading chamber collinear with projectile transfer duct 11 is provided with one or more spring clips 79. In operation, a projectile 1 passing up projectile transfer duct 11, enters loading chamber 75 and is captured in spring clip 79 with its leading edge abutting partition 81 at the end of the said loading chamber adjacent said launcher breech mechanism. Plungers 77 connected by actuation bar 78 extend through bores in side wall 76 of said loading chamber. Depression of said actuation bar causes said plungers to displace projectile 1 from retaining clip 79 and across into the opposite side of said loading chamber which is made collinear with short projectile transfer duct 69. The projectile then enters short projectile transfer duct 69 under the force of gravity or propelled by a release of pressurised fluid through inlet line 80. With duct 74 of breech block 70 aligned with short projectile transfer duct 69, the projectile is able to enter said breech block. Any accumulation of fluid in the breech block area is able to escape through venting aperture 72. Should a projectile be made shorter than the length of bore 74 in breech block 70, and the mechanism described in the present figures not be provided, the nose of the next succeeding projectile may follow a projectile into bore 74 of breech block 70, preventing it from being rotated to the firing position. The mechanism described acts to prevent this from occurring by permitting only one projectile at a time to be presented to said launcher breech block.

Figure 11:
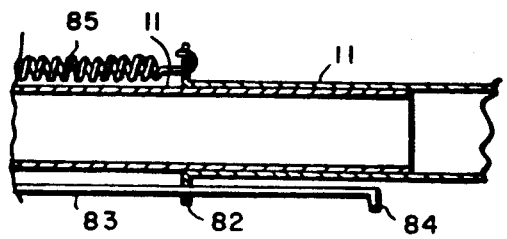
FIG. 11 is a longitudinal cross-sectional view of a telescopically extensible joint provision in a projectile transfer duct.

With reference to FIG. 11, a projectile transfer duct 11 is made telescopic, the end of the outer telescoping part being provided with radial flange 82. One or more retraction springs 85 are provided such that one end of each is attached to a flange or lugs on the inner telescoping part (not shown) and the other end or ends are attached to flange 82. One or more guide rods 83 are provided such that one end of each is attached to a flange or lugs on the inner telescoping part (not shown) and pass through holes in flange 82 to terminate in a lug 84. In operation, where projectiles are fed or propelled up projectile transfer duct 11 at a rate greater than which they are being consumed by cycling of the launcher, said projectile transfer duct 11 will be forced to telescopically extend against the force of retraction spring or springs 85. The degree of telescopic extension will be limited by lug 84 on guide rod or rods 83 abutting flange 82 on the outer telescoping part. Cycling of the launcher breech mechanism such that the bore in its breech block is aligned with projectile transfer duct 11 will cause a projectile to be propelled into the said breech block through the retraction of the said telescoping part under the influence of retraction springs 85.

Figure 12:
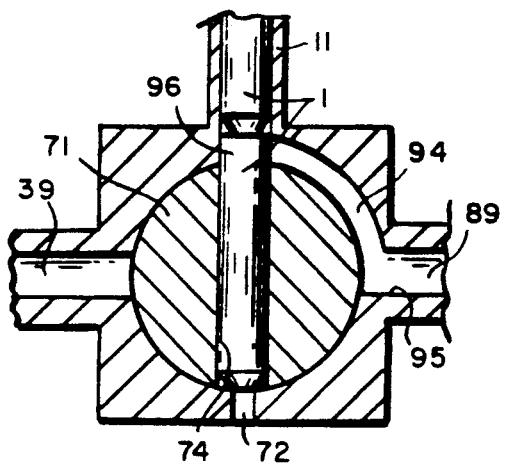
FIG. 12 is a longitudinal cross-sectional view of an alternative embodiment of a launcher rotary breech mechanism.

With reference to FIG. 12, a form of breech block assembly is shown which obviates the need for accurate positional control of the rotary breech block of the form depicted in FIGS. 8 and 9 previously described. In this embodiment, a shallow quadrantal groove 94 is provided in breech block housing 71 extending from the entry of projectile transfer duct 11 to the entry of cleaning medium entry duct 89. When said breech block is rotated to bring an oversized projectile into alignment with barrel 39, the projecting portion 96 of the projectile abuts surface 95 at the point of entry of cleaning medium entry duct 89 to breech block 71 and further rotation is prevented thereby aligning the projectile with the launcher barrel.

Figure 13:
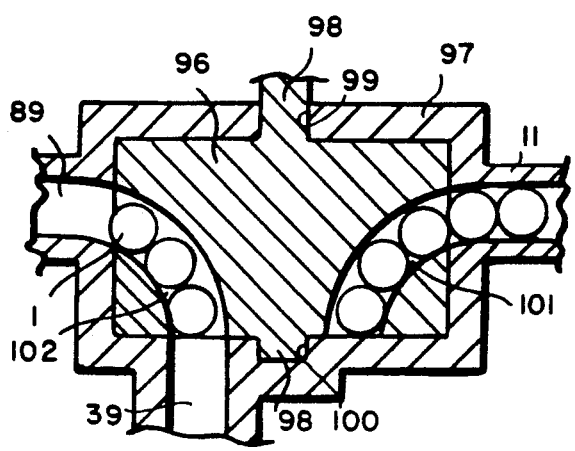
FIG. 13 is a longitudinal cross-sectional view of an alternative embodiment of launcher rotary breech block mechanism adapted to feed groups of spherical projectiles.

With reference to FIG. 13, a form of rotary breech block is provided capable of feeding sequences of spheres, either loose or interlinked, or sequences of other short elements of suitable shape either loose or interlinked. In this embodiment, breech block 96 is rotatably supported on shaft 98, the axis of rotation of which is made parallel to that of barrel 39. Shaft 98 is supporting in bearings 99 and 100 formed in breech block housing 97. One or more arcuate chambers 101 and 102 are provided in said breech block passing from its curved peripheral face to emerge through its flat circular face adjacent barrel 39 so that projectiles are received into said arcuate chambers from duct 11 and discharged therefrom by a flow of liquid pressure from line 89 into barrel 39.

With reference to FIGS. 14 and 15, rotary breech block 104 is rotatably supported on shaft 105 on bearings 106 formed in breech block housing 103. Projectile transfer duct 11 is made with a rectangular cross-sectional shape to accommodate projectiles 1 being fed laterally such that their longitudinal axes are positioned parallel to the rotational axis of said breech block and the longitudinal axis of launcher barrel 39. Breech block 104 is provided with a plurality of chambers 107 deep enough to accommodate a projectile and which are open to the circumference of the said breech block.

With reference to FIG. 16, a rotary breech block arrangement is provided similar to that depicted in FIGS. 14 and 15 excepting that a quadrantal annular recess or chamber 108 is provided in breech block housing 71 joining the entry of projectile transfer duct 11 to the entry of cleaning medium entry duct 89. Chambers 109 are provided in breech block 113 with a depth equal to the semi diameter of a projectile. The radial depth of said quadrantal annular chamber 108 is made such that a projectile can be accommodated half within it and half within breech block chambers 109. In operation, projectiles 1 enter chambers 109 in breech block 113 from projectile transfer duct 11 and, with the rotation of the said breech block, are carried around through said quadrantal annular space until part of their leading surface abuts surface 110 at the end of said quadrantal annular space. In this position, the projectile is aligned with launcher barrel 39 to enable movement therealong.

Figure 18:
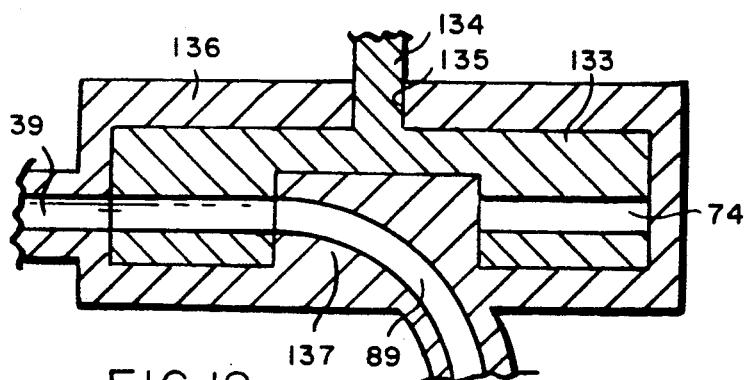
FIG. 18 is a longitudinal cross-sectional view of a further alternative embodiment of the launcher rotary breech block mechanism.

With reference to FIG. 17, a rotary breech block arrangement is depicted similar to that depicted in FIGS. 14 and 18, excepting that provision is made for entry of the liquid cleaning medium radially through duct 89 into the breech block housing 103. In this embodiment, breech block 104 is extended axially, said extension being provided with curved entries 111 to each chamber 107 in breech block 104. Positioned in each of said curved entries is thin radial locating web 112. Cleaning medium duct 89 is shaped at the point where it enters breech block housing 103 to provide a smooth transition to curved entries 111.

Figure 19:
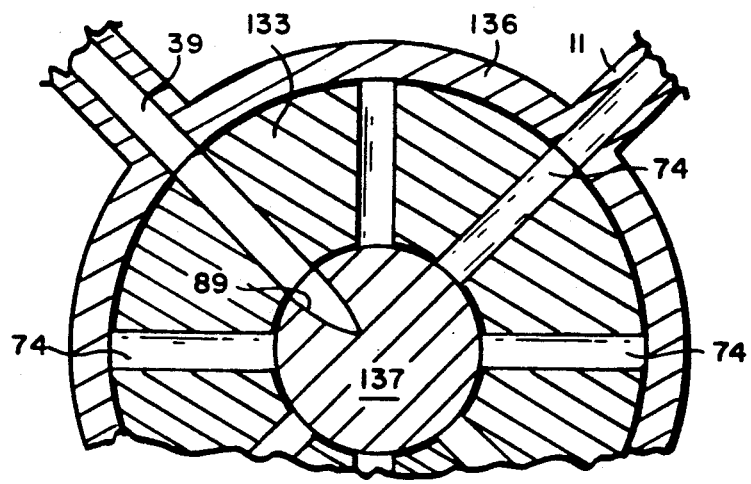
FIG. 19 is a transverse cross-sectional view of the mechanism shown at FIG. 18.

With reference to FIGS. 18 and 19, rotary breech block 133 is rotatably supported within breech block housing 136 upon boss 137 formed on one flat wall of said breech block housing and shaft 134 passing through the opposite wall of said housing and carried in bearing 135 formed in that wall. A plurality of radial bores 74 is formed in said breech block. Projectile transfer duct 11 and launcher barrel 39 are fixed to breech block housing 136, the angular distance between them being such that their axis may be simultaneously coincident with any two of bores 74 in rotary breech block 133. Cleaning medium duct 89 is formed in boss 137 such that its upper or inner end is collinear with launcher barrel 39. In operation, whilst a projectile is being "fired" from one of the said bores in breech block 133 positioned collinear with barrel 39 by the release of a flow of pressurised cleaning medium through entry duct 138, another of said bores in breech block 133 is positioned collinear with and is recharged with a projectile from projectile transfer duct 11. Spring detents may be provided if required between rotary breech block 133 and breech block housing 136 to ensure accurate alignment of bores 74 with launcher barrel 39 and projectile transfer duct 11. Obviously, movement of breech block 133 may be purely rotary or may be semi-rotary such that one or more bores 74 in breech block 133 will alternate back and forth between launcher barrel 39 and projectile transfer duct 11.

Figure 20:
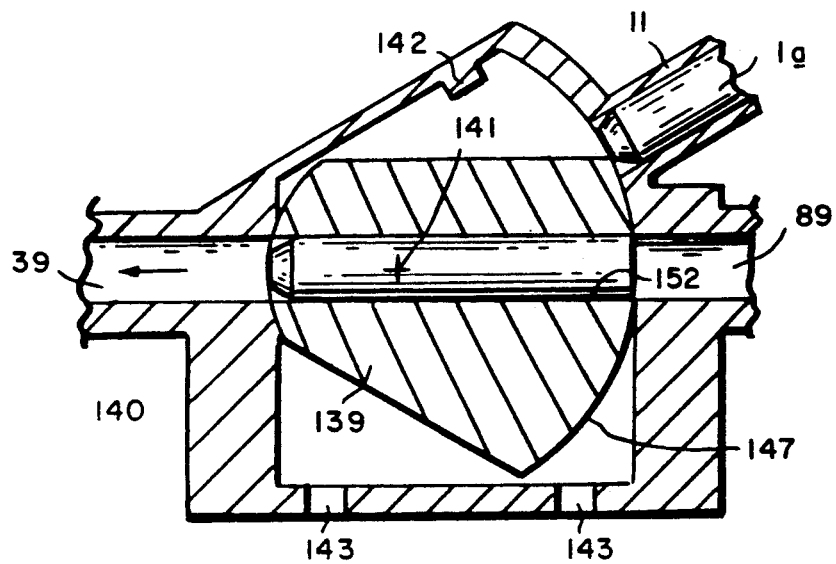
FIGS. 20 to 22 are longitudinal cross-sectional views of alternative embodiments of launcher falling block type breech mechanisms.

With reference to FIG. 20, falling breech block 139 is pivotally mounted within breech block housing 140 upon shafts (not shown) positioned on axis 141 and supported in bearings (not shown) formed in the side wall of said breech block housing. Bore 152 is provided extending throughout the length of said breech block and, with said breech block in its lowered position against stops formed in housing 140 (not shown), said bore is positioned collinear with cleaning medium entry duct 89 and launcher barrel 39. In the raised position of the said breech block against stops 142 formed in housing 140, a projectile from projectile transfer duct 11 is able to enter bore 152. With said breech block in its lowered position, the next succeeding projectile from projectile transfer duct 11 (shown as 1a in the figure) is prevented from movement by its abutting the top of the larger curved edge 147 of breech block 139. Drain holes 143 are provided at the lowest point of breech block housing 140 to provide a means of escape for any accumulation of liquid cleaning medium in the breech block area. Movement of the breech block is effected by torque applied through its said supporting shafts, said torque being provided by any suitable rotary actuator providing the desired angular movement followed by a suitable rest. Sprung detents are provided as required between breech block 139 and breech block housing 140 to ensure accurate registration of said breech block with said cleaning medium entry duct and said launcher barrel 39.

Figure 22:
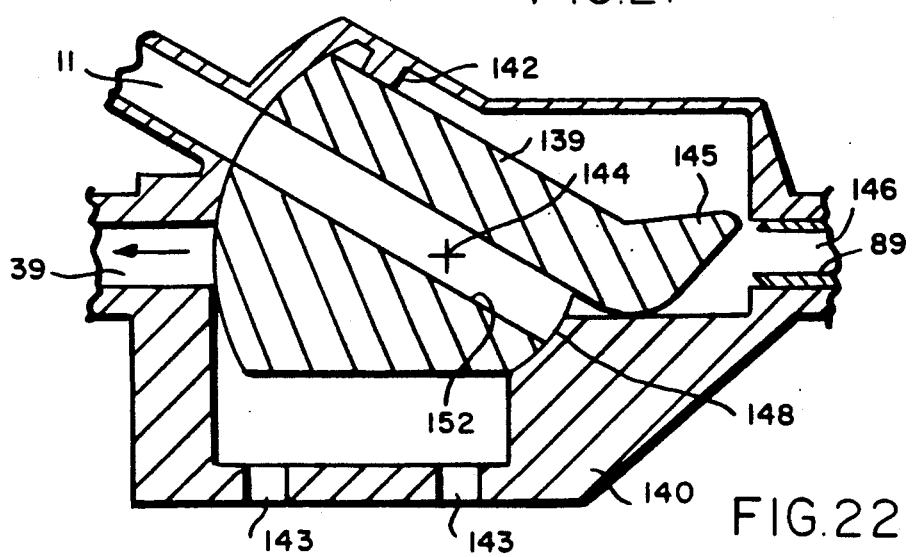

With reference to FIG. 22, a form of breech block modified from that shown in FIG. 20 is depicted. Breech block 139 is pivotally supported in breech block housing 140 on shafts (not shown) positioned on axis 144. Said breech block is provided with cam 145 on its end nearest cleaning medium entry duct 89.

In operation, breech block 139 is moved by spring means (not shown) to its raised position against stop 142 formed in breech block housing 140. In this position, bore 152 passing through the length of breech block 139 is positioned collinear with projectile transfer duct 11 and is charged with a projectile from it. Moveable cleaning medium duct 146 is then extended through duct 89 and, in co-operating with cam 145, causes breech block 139 to pivot to its lowered position against stops (not shown) formed in breech block housing 140 such that its bore 152 is collinear with launcher barrel 39. Further movement of moveable cleaning medium duct 146 displaces said projectile from bore 152 in breech block 139 and into launcher barrel 39. A cleaning shot is then "fired" by the release of a flow of pressurised cleaning medium through moveable cleaning medium duct 146. During charging of bore 152 in breech block 139, a projectile is prevented from passing downwards through said bore by its end abutting curved surface 148 formed in breech block housing 140.

Figure 21:
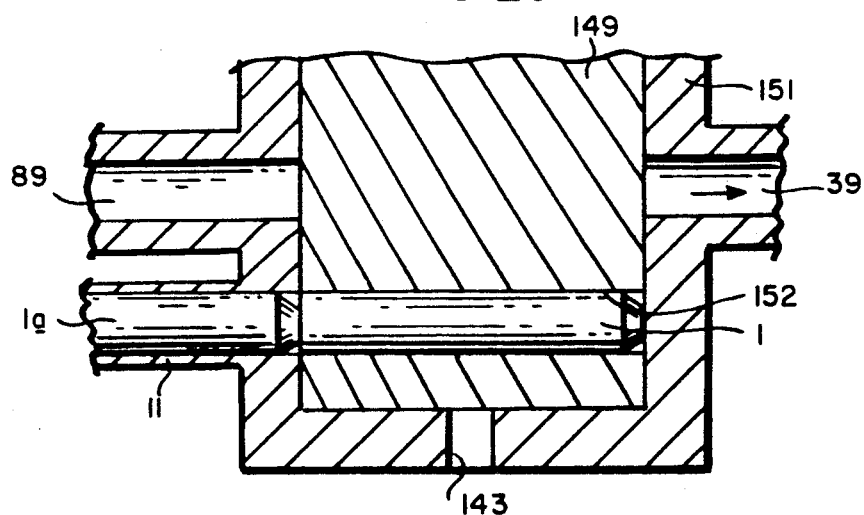

With reference to FIG. 21, an alternative form of falling breech block is depicted. In this arrangement, breech block 149 is slidably accommodated within breech block housing 151. At one extremity of movement of the said breech block, bore 152 passing through the width of said breech block is positioned collinear with projectile transfer duct 11. At the other extremity of movement of the said breech block, bore 152 is positioned simultaneously collinear with cleaning medium entry duct 89 and launcher barrel 39. Movement of the said breech block is effected by any suitable means of mechanical actuation.

Figure 23:
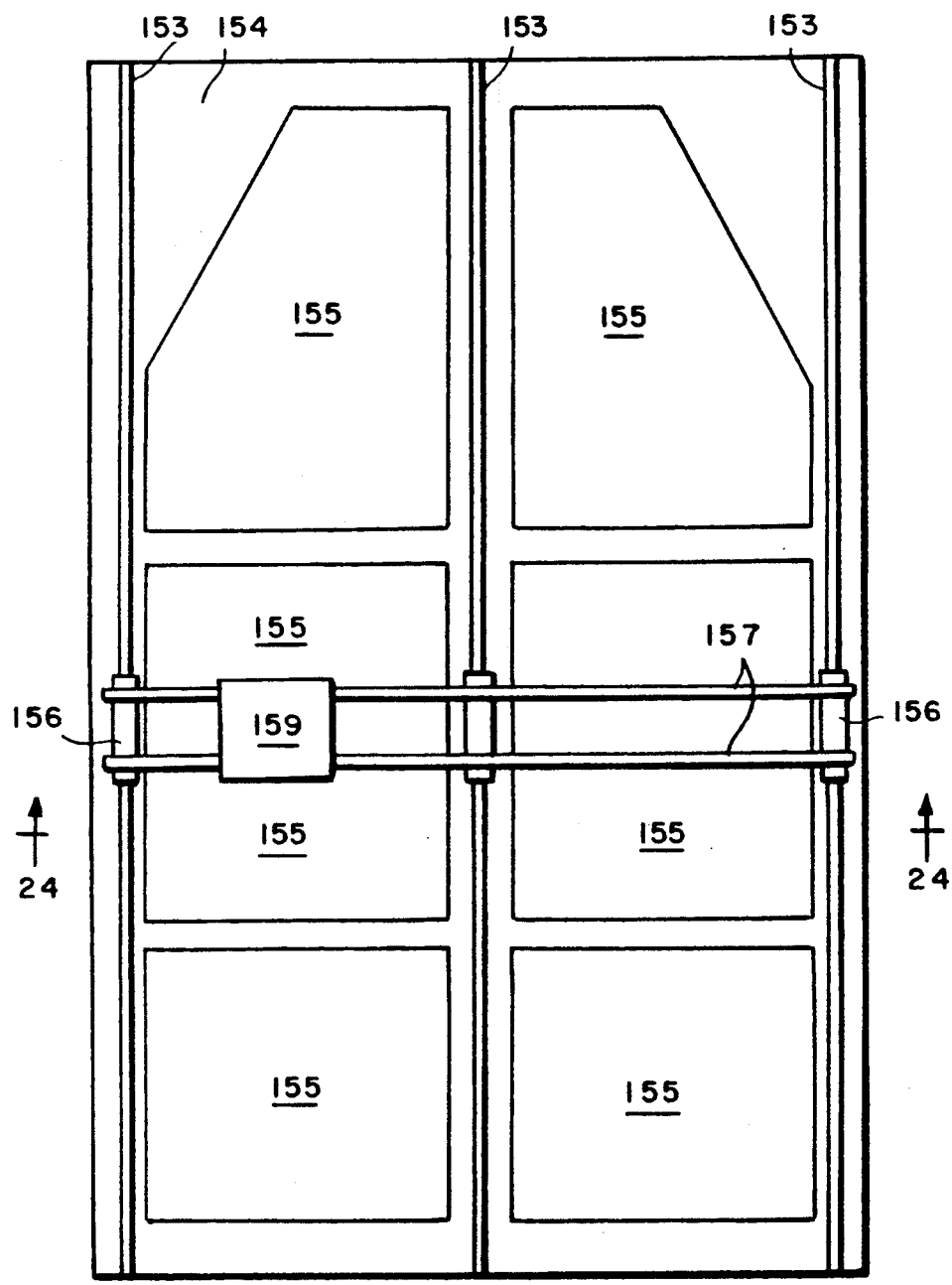
FIG. 23 is a view of one embodiment of an X/Y axis support and positioning mechanism adapted to deploy a launcher over a large array of tubes.
Figure 24:
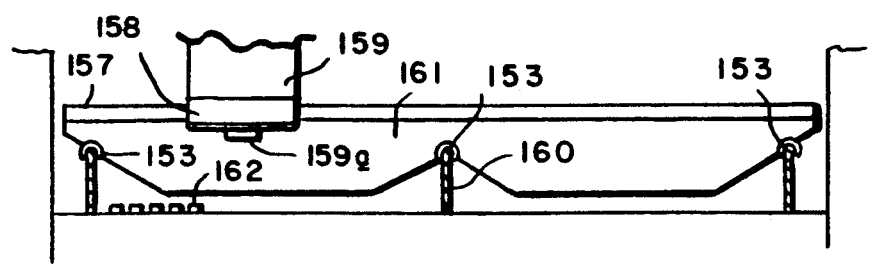
FIG. 24 is a transverse cross-sectional view on line 24—24 of the mechanism shown at FIG. 23.

With reference to FIGS. 23 and 24, condenser tubes terminating in tube sheet 154 are arranged in discrete arrays, the various extents of which are delineated as 155. Vertical support rails 153 are carried upon the outer edges of webs 160 which are fixed to tube sheet 154 outside the area of said tube arrays. Said vertical support rails are made with any suitable cross-sectional shape. Carriages 156 are slidably supported upon said vertical support rails and, in the preferred embodiment, are provided with plain bearings of some suitable material. Said bearings are lubricated as required with any suitable pressurised fluid which, in the preferred embodiment, is water. Carriages 156 are joined by stiffening webs 161, to the outer edges of which are fixed horizontal support rails 157. Said horizontal support rails are made with any suitable cross-sectional shape. Slidably supported upon said horizontal support rails is launcher carriage 158 upon which is carried launcher support casing 159. A launcher (not shown) is carried within said launcher support casing and is made such that its barrel 159A can be retracted sufficiently to allow said launcher support carriage to pass freely over vertical support rails 153 and carriages 156. Carriages 156 are moved along vertical support rails 153 in synchronisation and launcher support carriage 158 is moved along horizontal support rails 157, in both cases by any suitable means of linear actuation. In the preferred embodiment, such methods of linear actuation are screw jacks, hydraulic rams, systems of cables and pulleys or chains and sprockets, hydraulic motors, or the like. The position of the launcher barrel in X and Y coordinates is detected by sensing devices on the moving carriages which scan linear scales adjacent to the said horizontal and vertical support rails. In an alternative embodiment, rotary encoders are incorporated into rotary actuators employed in conjunction with screw actuators, cables and pulleys or chains and sprockets. As the carriages on the said vertical rails are widely separated, their movement is synchronized by cables or chains attached to each and passing over pulleys or sprockets at each end of the said tube sheet, the rotation of which are synchronized by one or more connecting shafts. Cables and ducts passing from the outside of the heat exchanger casing to the projectile launcher are supported by suitable saddles and spring support means. In operation, the said actuation means moves the said carriages upon their respective rails in accordance with commands from a stored program to locate each individual tube in the various arrays which make up the total condenser tube bundle. Positional feedback is provided to the controlling computer by the said position sensing devices. Interlock means are provided to ensure that all functions in the cleaning cycle are performed properly and in sequence, the operating program being halted and an alarm sounded should any fault or interruption occur.

Figure 26:
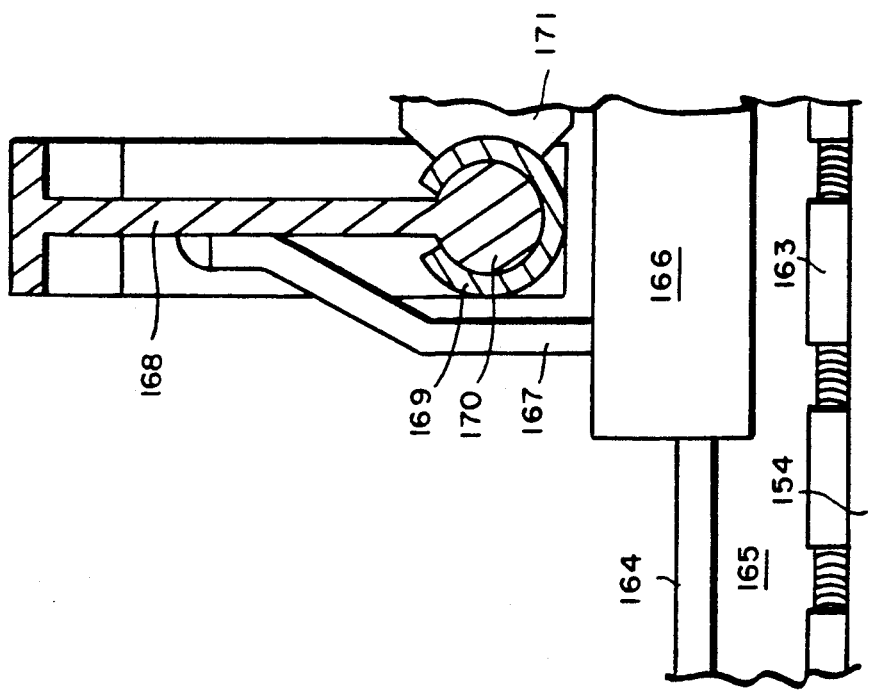
FIG. 26 is a further partial sectional view of the positioning and support provisions shown at FIG. 25.
Figure 25:
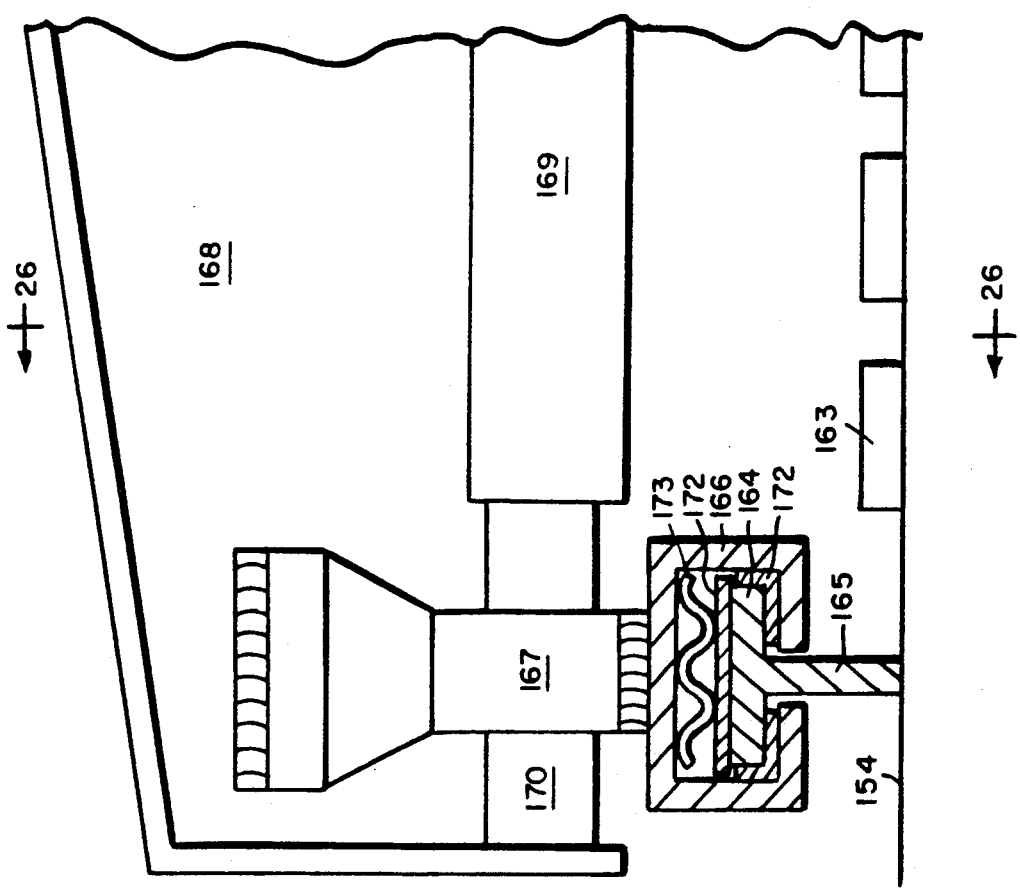
FIG. 25 is a partial sectional view of the structural members and bearing provisions of an alternative form of X/Y axis positioning and support mechanism.

With reference to FIGS. 25 and 26, longitudinal support rail 164 is supported upon web 165 which is fixed to heat exchanger or condenser tube sheet 154. Carriage 166 is slidably supported upon said rail and embodies bearing elements 172 which are captured within said carriage and held in place by spring element 173. The inner end of support strut 167 is fixed to said carriage, the outer end being fixed to lateral rail support web 168, on the inner edge of which is carried lateral support rail 170. Slidably supported upon said lateral support rail is launcher support carriage 168 to which launcher support casing (not shown) is fixed by bracket 171. The arrangement described embodies the actuation and position sensing means described in relation to FIGS. 29 and 30. In operation, launcher support barrel (not shown) is extended to engage the ends of tubes 163 during the cleaning process and may be retracted sufficiently for its end or muzzle to pass over longitudinal support carriages 166 and allow said launcher free movement throughout the length of lateral support rails 170.

Obviously, the embodiment described may be modified so that webs 165 and longitudinal support rails 164 may be supported from the end cover of a heat exchanger or condenser casing rather than being fixed to the tube sheet.

With reference to FIGS. 27 and 28, a rotary axis type launcher support arrangement is depicted. In this embodiment, heat transfer tubes 175 fixed to tube sheet 174 are cleaned by a launcher 192 slidably mounted upon a radial arm 178 which is free to rotate through 360°. Fixed to the inner edges of radial arm 178 are launcher support rails 188. Said radial arm is fixed to hollow shaft 181 which is rotatably supported in bearing and seal arrangement 182 carried in housing 183 incorporated into heat exchanger end cover 176. Said heat exchanger end cover is stiffened by radially disposed webs 177 fixed to its outer surface. Shaft 181 is driven in a rotational sense by actuator 184 through drive means 185 under the direction of a stored program. Slidably supported on rails 188 is launcher carriage 179 to which is fixed launcher support casing 193 by means of brackets 189. Long screws 190 are rotationally supported in bearings in each end of said radial arm and are enclosed in protective telescopic tubes 191. Nuts 194 coact with long screws 190 and are also fixed to said launcher support casing by brackets 189. Said long screws are driven in a rotational sense to position said launcher radially on said radial arm in accordance with a stored program by rotary actuator 180 mounted on the inner end of said radial arm. Suitable linear and rotational sensing apparatus is used to detect angular displacement of said radial arm and radial displacement of said launcher support casing along said radial arm. Suitable swivel joints are provided in all conduits leading into said heat exchanger casing from its exterior to accommodate rotation of said hollow shaft.

With further reference to FIG. 29, nut 194 coacts with long screw 190, the resultant movement being transmitted to launcher support casing 193 by bracket 189. Fixed to the body of said nut are protective tube sections 191 with which are in telescopic engagement with extension tube sections 195, said tube sections being sealed to each other by seals 196. The interior of said protective tubes is filled with some suitable projective lubricating liquid, any displaced volume of which is accommodated in flexible bladders located within the liquid-filled heat exchanger header box, said bladders being connected to the interior of said protective telescopic tube arrangement by suitable conduits.

With reference to FIGS. 30 and 31, launcher 192 is slidably supported within launcher support casing 193 with lugs 215 on said launcher coacting with grooves 216 formed on the inside of said launcher support casing. Launcher barrel 197 extends through bearing means 199 formed in one end of said launcher support casing, muzzle fitting 198 being adapted to engage the ends of tubes to be cleaned. Projectile transfer duct 201 passes through a suitable slot in said launcher support casing to convey projectiles to a rotary breech block arrangement within said launcher. Said rotary breech block is actuated by quadrant 203 fixed to breech block pivot shaft 202, said quadrant engaging rack 204 actuated by linear actuator 206. Said linear actuator is fixed to the body of said launcher and extends out through said launcher support casing through a suitable access slot. Said launcher is slidably displaced towards the barrel end of said launcher support casing against the urging of return spring 200 to engage, launcher barrel muzzle 198 with the end of a tube to be cleaned. Launcher deployment levers 207 are pivotally supported on shaft 209 carried in bearings formed in brackets 213 which are fixed to said launcher support casing. Said launcher deployment levers may be depressed by the action of lever 210 applying torque to said pivot shaft as a result of a force applied to the end of lever 210 by linear actuator 212 though link 211. Depression of said launcher deployment levers causes rollers 208 to apply a force to the end of said launcher body, slidably displacing it within said launcher support casing. Cleaning medium duct 214 is rigidly fixed to said launcher body and passes out through said launcher support casing through a suitable aperture. Launcher support carriages 179 (shown only on FIG. 30) are attached directly to said launcher support casing or indirectly through brackets and are slidably supported upon launcher support rails (shown as 188 in FIGS. 27 and 28). In operation, with no force applied by launcher deployment actuator 212 to launcher deployment levers 207, said launcher is retracted into said launcher support casing under the influence of launcher return spring 200. A projectile passes through projectile transfer duct 201 to the bore of a rotary breech block (not shown) within said launcher body. Breech block actuator 206 then actuates rack 204 engaged with quadrant 203 to rotate said breech block such that its internal bore is collinear with that of launcher barrel 197. Launcher deployment actuator 212 then applies a force through link 211 to lever 210, the resultant torque in shaft 209 causing launcher deployment levers 207 to be depressed and apply a force through rollers 208 to the end of said launcher body causing said launcher body to be displaced within said launcher support casing against the urging of launcher return spring 200 and causing launcher barrel 197 to extend through bearing arrangement 199 and bring launcher barrel muzzle 198 into engagement with the end of a tube to be cleaned. A flow of pressurised cleaning medium is then released through cleaning medium duct 214, propelling said projectile from said bore in said rotary breech block through said launcher barrel to the tube to be cleaned. Launcher deployment actuator 212 is then deactivated allowing said launcher to be displaced within said launcher support casing under the urging of launcher return spring 200 and causing launcher barrel 197 to retract within said launcher support casing causing said launcher barrel muzzle to disengage from the end of tube just cleaned. Said launcher barrel is then positioned collinear with the next tube to be cleaned by rotation of said radial support arm and radial movement of said launcher support casing on said radial arm. The cleaning cycle is then repeated.

With reference to FIG. 32, launcher support casing 193 is made cylindrical and the body of launcher 192 is made cylindrical and is sealingly and slideably accommodated within it. Said launcher support casing is made closed at its end remote from launcher barrel 197 and cleaning medium duct 214 is made straight and collinear with said launcher barrel and passes out through the end of said launcher support casing through suitable sliding sealing provisions. Said launcher is deployed, bringing barrel muzzle 198 of said launcher barrel into engagement with the end of a tube to be cleaned, by the admission of pressurised fluid through inlet 241 to cylinder 244 between its end face and the end of said launcher support casing, suitable sealing provisions between said launcher body and said launcher support casing preventing loss of said pressurised fluid. In a similar manner to the arrangement depicted in FIG. 31, said launcher barrel passes out through the forward end of said launcher support casing and is slideably supported in bearing means 199. Similarly also, launcher return spring 200 is provided between the end of said launcher body and the end of said launcher support casing adjacent said launcher barrel to urge said launcher body back towards the end of said launcher support casing to effect retraction of said launcher barrel. Said launcher body accommodates rotary breech block 237 which is rotationally supported on shafts (not shown) carried in bearings (not shown) formed in said launcher body. Said rotary breech block is provided with flat surfaces formed on its peripheral curved faces disposed symmetrically about the openings of bore 236 provided within it. Barrel 197 is slideably accommodated in the end of said launcher body and a flange 233 formed on its inner end is captured within a suitable recess 245 in said launcher body. Sealing means 234 are provided on the face of flange 233 adjacent said rotary breech block. Said launcher body is provided with an axial extension 232 which passes out through the end of said support casing 193 through suitable sliding sealing means. Formed within said axial extension is cylinder 243 in which is slideably and sealingly supported piston 238 which is provided with sealing means 240 on its face adjacent said rotary breech block. Attached to piston 238 and collinear with bore 236 in said rotary breech block and said launcher barrel is cleaning medium duct 214, the bore of which passes through said piston. Said cleaning medium duct passes out through sliding sealing provisions in the end of said axial extension. Aperture 242 allows fluid pressure in cylinder 244 to be communicated to cylinder 243. Venting apertures 285 are provided in the forward end of said launcher support casing to allow displacement of any fluid which finds its way into space 246 between the front end of said launcher body and the forward end of said launcher support casing.

In operation, said launcher barrel muzzle is positioned collinear with and adjacent the open end of a tube to be cleaned. Rotary breech block 237 is cycled to the load position and a projectile enters bore 236 in it from projectile transfer duct 201. Said breech block is then cycled to the fire position in which its said bore is collinear with cleaning medium duct 214 and launcher barrel 197. Pressurised fluid is then admitted to cylinder 244 through inlet 241, causing launcher body 192 to move forward against the urging of return spring 200 to cause muzzle 198 of launcher barrel 197 to be brought firmly into contact with the open end of said tube to be cleaned. Rearward pressure on said launcher barrel causes sealing provisions 234 on its inner end to be sealingly applied to forwardly disposed flat face on said rotary breech block 237. At the same time as cylinder 244 is pressurised, fluid pressure passes through aperture 242 to pressurise cylinder 243, causing piston 238 to move inward and bringing sealing provisions 239 on its inner end into sealing contact with rearwardly disposed flat face on said rotary breech block. A flow of pressurised liquid cleaning medium is then released through said cleaning medium duct, carrying said projectile from said bore in said rotary breech block, out through said launcher barrel and into said tube to be cleaned. Cylinder 244 is then vented to allow said launcher body to retract rearwards under the influence of return spring 200, said launcher barrel is repositioned collinear with the next tube to be cleaned, and the cycle is repeated.

In operation of a combination generally of the various elements of the present invention, spent projectiles may be recovered from the tubeside downstream liquid flow by screening of the cooling water outfall from a condenser or, in other embodiments, by a cyclone separation unit incorporating a rotary lock. Where the projectile material is denser than the tubeside liquid flow, said rotary lock is positioned at the bottom of said cyclone separation unit. Where the projectile material is less dense than the tubeside liquid flow, it is positioned at the top.

Projectiles are made from any suitable durable material or, where it is desired not to retrieve them from a heat transfer unit, they are made from water ice or some other suitable material which will melt or dissolve in the downstream tubeside liquid flow.

What is claimed is:

1. A projectile launcher adapted for use in tube cleaning apparatus, said launcher comprising a launcher barrel having a muzzle end adapted for movement towards a tube to be cleaned, a fluid delivery path extending through said launcher and said launcher barrel, a projectile transfer duct arranged to sequentially supply projectiles to said launcher along a projectile supply path transverse to said fluid delivery path, and a projectile transfer mechanism adapted to transfer a said projectile from said projectile supply path into alignment with said fluid delivery path while maintaining said projectile supply path sealed from said fluid delivery path, said transfer mechanism comprising a breech block mechanism located in said fluid delivery path, said breech block mechanism comprising a breech block member arranged for movement within a breech chamber, said breech block member being movable from a first position where a said projectile is received therein from said projectile supply path to a second position where said projectile is aligned with said fluid delivery path.

2. A projectile launcher according to claim 1, wherein said breech block member is arranged for pivotal movement within said breech chamber between said first and second positions.

3. A projectile launcher according to claim 2, wherein a fluid delivery duct member through which said fluid delivery path passes extends into said breech chamber, said fluid delivery duct member having an inner end within said breech chamber being movable relative to said breech block member, second seal means being provided operable between said inner end of said fluid delivery duct member and said fluid delivery duct member and said breech block member when said breech block member is located in said second position.

4. A projectile launcher according to claim 3, wherein said piston member is movable towards the muzzle end of said launcher barrel under the influence of pressurized fluid against a spring force.

5. A projectile launcher according to claim 2, wherein said breech block chamber is located in a piston member movably located within a casing, said piston member being movable towards the muzzle end of said launcher barrel upon said launcher barrel being held stationary.

6. A projectile launcher according to claim 5, wherein said inner end of the fluid delivery duct member is urged towards said breech block member by fluid pressure to engage said second seal means.

7. A projectile launcher according to claim 1, wherein said launcher barrel at an inner end opposite to said muzzle end extends into said breech chamber with said inner end being movable relative to said breech block member, first seal means being provided operable between said inner end of said launcher barrel and said breech block member when said breech block member is located in said second position.

8. A projectile launcher according to claim 1, wherein said launcher barrel is connected to a launcher body section, said barrel and body section being movable towards or away from the tube to be cleaned within a support housing, said fluid delivery path being formed axially through said barrel and body section, and said breech block mechanism being located in said fluid delivery path within said body section.

9. Apparatus for cleaning an array of tubes having open ends at at least one end of said array, and at least one end cover enclosing a head space adjacent said tube open ends, said apparatus comprising a projectile launching mechanism adapted to be mounted within said head space for movement therein to align and engage projectile delivery means selectively with an open end of a said tube of the array of tubes to be cleaned, projectile supply means for moving projectiles sequentially to a position adjacent said launching mechanism, a pressurized liquid passage passing through said projectile launching means, a projectile transfer mechanism enabling sequential sealed transfer of a said projectile from the projectile supply means to said pressurized liquid passage, and means for supplying a flow of pressurized liquid along said pressurized liquid passage to move a said projectile located therein into and through said tube to be cleaned.

10. Apparatus according to claim 9, further including means for positioning and supporting projectile launchers within the head space of said array comprising first elongate guide means upon which said launcher is slidably supported, said first guide means including bearing means slidably supported on a plurality of fixed parallel rails positioned normal to said first guide means and fixed to either tube sheet an end plate supporting said array of tubes or a head space end cover of the array of tubes.

11. Apparatus according to claim 9, further including means for positioning and supporting projectile launchers within the head space of said array comprising first elongate guide means upon which a said launcher is slidably supported, said first guide means being disposed parallel to an end plate supporting the array of tubes and rotationally supported on a shaft which is disposed normal to said end plate and fixed to said end plate or a head space end cover of the array of tubes.

* * * * *